(No Model.)
E. CLARENBACH.
APPARATUS FOR MAKING FERTILIZERS.
No. 603,942. Patented May 10, 1898.
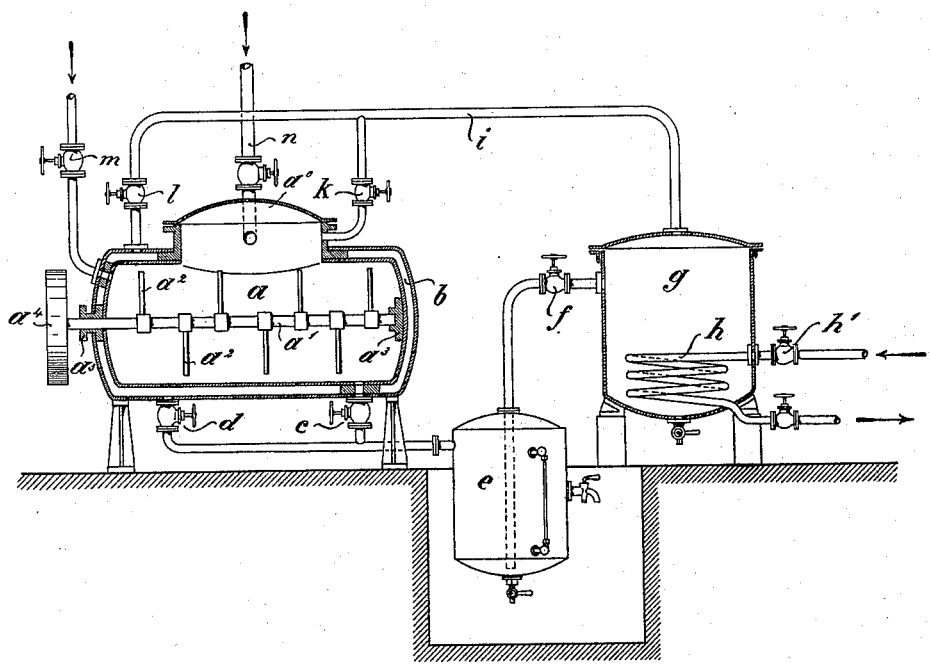
Witnesses:
Chas. E. Riordon
S. C. Edmonston
Inventor:
Eugen Clarenbach
By Julius C. Dowell
His Atty

UNITED STATES PATENT OFFICE.

EUGEN CLARENBACH, OF BERLIN, GERMANY.

APPARATUS FOR MAKING FERTILIZERS.

SPECIFICATION forming part of Letters Patent No. 603,942, dated May 10, 1898.

Application filed February 7, 1898. Serial No. 669,394. (No model.)

*To all whom it may concern:*

Be it known that I, EUGEN CLARENBACH, one of the firm of Rud. A. Hartmann, at Berlin, a subject of the King of Prussia, German Emperor, residing at Berlin, German Empire, have invented new and useful improvements in apparatus for the manufacture of dried fertilizers, fat and glue from animal-cadavers or any parts thereof, or of all kind of animal substances, (for which applications for patents have been filed in Germany October 15, 1896; in France August 20, 1897; in Austria August 25, 1897, and in Hungary August 26, 1897,) of which the following is a specification.

My invention relates to the utilization of animal-cadavers, of parts thereof, and of all kind of animal substances in such a manner as to transform them or parts of them into dry powderous manure, into glue, and into fat without propagating bad odors.

The invention consists in an improved apparatus, the essential elements of which are recited in the appended claims and the preferred form of construction of which is specifically described hereinafter.

The method hitherto used for decomposing animal substances, such as whole cadavers or parts thereof, so as to obtain from them dry fertilizers in pulverized condition, glue, and fat, is accompanied by the inconvenient necessity that the vapors produced by the evaporation of the fat and water resulting from the treatment of the cadavers by steam of high pressure must again be condensed. It is impossible to carry out this process in a perfectly inodorous way and without a great loss of heat and waste of cooling-water. The extent of the inconveniences resulting therefrom is illustrated by the fact that animal-cadavers contain up to seventy-five per cent. of water, which in producing glue is to be evaporated. For overcoming this great economical disadvantage I proceed in the following manner: The cadavers or parts of them are treated, as usual, in a suitable digester with steam of high tension, whereby the fat and water are extracted. The vapors developed by concentrating the glue, however, are not, as heretofore, conducted to a condensator; but they are made use of for drying the digested material, so as to convert this into a condition in which it is capable of being ground. The pure water resulting from the condensation of the glue-vapors is led into a closed vessel containing the extracted fat and assists in clarifying the same. The whole process is carried out within a perfectly-closed system of apparatus, thus preventing any discharge of steam or vapors of offensive odor and any waste of cooling-water.

For carrying out such process I use an apparatus, substantially as illustrated by the accompanying drawing, in a vertical longitudinal section, partly in elevation. The apparatus consists in a digester $a$, provided with a steam-jacket $b$, the steam entering the latter by valve $l$ and the interior of the digesting vessel $a$ by valve $m$ and, as the case may be, by valve $k$. A shaft $a'$, carrying stirring-arms $a^2$ and mounted in suitably-arranged bearings $a^3$, is arranged within the vessel $a$ and, after motion having been imparted to it by means of a pulley $a^4$, serves to stir the material under treatment, whereby the penetration of the latter by the heat is accelerated. During the drying process the stirring-arms grind the material and bring it into a powderous condition. Valves $c$ and $d$ and adjoining pipes connect the interior of the digester $a$ and the deepest point of the steam-jacket with a collector $e$, and this again is connected with an evaporator $g$ by pipe and valve $f$. A heating-coil $h$, fed with steam or another heating agent by valve $h'$ or any other heating device, is combined with said evaporator. Pipe $i$ connects the upper part of the evaporator $g$ with the digester $a$ and conducts the vapors by valve $k$ back to the interior of the digester and by valve $l$ into the steam-jacket $b$. By the branch pipe provided with valve $k$ the vapors from the evaporator $g$ may be conducted so as to be used, if required, to aid in cooking the material to be treated.

The operation of the apparatus is as follows: The digester $a$ is charged through cover $a^0$ with the material to be treated, (cadavers or parts of them or other animal substances.) Then the cover is firmly closed and fresh steam is caused to enter through valve $m$. The material thus heated is digested, and the resulting water, mixed with the melting fat, commences to flow over into the collecting vessel $e$ through pipe and valve $c$. When this operation is continued for several hours and the stirring-arms $a^2$ are moved during this time, all the water (bouillon of glue) and fat are extracted from the material and collected in the collector $e$. By opening now the valve $f$ the whole bouillon of glue contained in vessel $e$ is, owing to the pressure in the digester, forced over to the evaporator $g$ and here subjected to the action of the heating-coil $h$. The contents of the vessel $g$ having thus been brought to evaporation, the valves $m$ and $c$ are closed and valves $l$ and $d$ opened in order to enable the vapors developed from the bouillon of glue in vessel $g$ to enter the steam-jacket $b$ and so to perform a drying action on the digested material in vessel $a$ while the condensed pure water flows down to the collector $e$, containing the fat. Owing to the continued rotation of the shaft $a'$ with its arms $a^2$ and the evacuation of the vapors evolved from the material in vessel $a$ by pipe $n$, said material not only is dried, but also perfectly pulverized. At the same time, as the process of drying and pulverizing goes on a continually-increasing concentration of the bouillon of glue takes place in the vessel $g$ and the developed glue-vapors condense in the jacket $b$, the resulting liquid being led off in the form of pure water to the collector $e$. The fat contained therein is, by the continued contact with the said water flowing through it, mechanically released from adhering parts of dirt and is thus clarified and may finally be drawn off as a marketable product.

It is a feature of my invention that the concentration of the glue, the drying of the digested masses of bones and flesh, the condensation of the vapors of glue, and the clarification of the fat by means of the distilled water take place, essentially, at the same time. A further feature consists in the fact that the said simultaneous processes are performed in a system of perfectly-closed apparatus, of which the separate vessels are subjected to the same pressure.

The novel technical effects resulting from the employment of the apparatus described are utilization of the heat of the vapors of glue, prevention of offensive odors arising from the working of the process, and economy in cooling-water and fuel otherwise necessary for burning the non-condensed gases.

What I claim as my invention, and desire to secure by Letters Patent of the United States, is—

1. The combination, in an apparatus for the utilization of animal-cadavers or parts thereof, of the digester $a$, collector $e$ and evaporator $g$ with a pipe and valve connection for continually conducting the extracted liquids and the water condensed in the steam-jacket $b$ from the first vessel or digester to the second vessel $e$ and the vapors from the third vessel $g$ back to the jacket of the digester, all essentially as specified.

2. In an apparatus for making fertilizers from animal substances, the combination with the digester having a valve-controlled steam-inlet thereto, of a collector, a valve-controlled pipe or conduit leading from the interior of said digester into said collector, a valve-controlled branch pipe or conduit leading from the steam-space around said digester into said collector, an evaporating vessel in connection with the interior of said collector through a valve-controlled pipe or conduit, and a pipe or conduit leading from said evaporator to the interior of said digester and also communicating with said steam-space, and valves for controlling said several pipes or conduits, substantially as described.

3. The combination in an apparatus for the utilization of animal-cadavers or parts thereof, of the digester having a steam-jacket, the collector arranged below the plane of the digester, a pipe or conduit connecting said collector with the interior of said digester and with said steam-jacket, an evaporating vessel located above the plane of said collector, a pipe or conduit leading from the interior of said collector near the bottom thereof into said evaporator, a heating-coil within the latter, having inlet and outlet pipe connections with a valve in each for controlling the same, a pipe or conduit leading from said evaporating vessel to the digester-jacket and also to the interior of the digester, a valve-controlled steam-inlet pipe communicating with the interior of the digester, and valves controlling the pipes or conduits connecting the digester and collector and the collector and evaporator, substantially as described.

4. In an apparatus for treating animal-cadavers or parts thereof for the purpose of producing therefrom dry manure in powderous condition, a digester having a steam-jacket, an agitating device or stirrer within the digester, a collecting vessel for receiving the fluid matter and water from said digester, pipes or conduits leading from the interior of said digester and said steam-jacket into said collector, a valved pipe or conduit connecting said collector and evaporating vessel, conduits or pipes leading from the evaporator into the interior of said digester and said steam-jacket, and valves for controlling the flow of fluid matter and water from said digester and steam-jacket into said collector, and from the latter into said evaporator, and the vapors from the evaporator into said digester and steam-jacket, substantially as described.

5. An apparatus for treating animal-cadavers or parts thereof for the purpose of producing therefrom dried fertilizing material, comprising a digester having a steam-jacket and a steam-inlet pipe communicating with the interior thereof, a collecting vessel arranged below the plane of said digester, valve-controlled pipes or conduits leading from the interior of the digester and the steam-jacket thereof into said collector, an evaporating vessel, a valve-controlled pipe or conduit leading from the collector into said evaporator, pipes or conduits connecting the evaporator with the interior of the digester and its steam-jacket, and valves for controlling the inlets to the latter, the whole constituting a perfectly-closed fluid and vapor circulating system adapted to prevent the escape of steam or vapors and offensive odors and any waste of cooling-water, substantially as described.

In witness whereof I have hereunto set my hand in presence of two witnesses.

EUGEN CLARENBACH.

Witnesses:
CHARLES H. DAY,
HENRY HASPEE.